US006826473B1

(12) United States Patent
Burch et al.

(10) Patent No.: US 6,826,473 B1
(45) Date of Patent: Nov. 30, 2004

(54) PDA WITH INTEGRATED NAVIGATION FUNCTIONS AND EXPENSE REPORTING

(75) Inventors: Matthew C. Burch, Lawrence, KS (US); Benjamin E. Jones, Olathe, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/068,992

(22) Filed: Feb. 8, 2002

(51) Int. Cl.$^7$ .......................... G06F 19/00; G06F 7/00; G01C 21/20

(52) U.S. Cl. ...................... 701/207; 701/201; 705/417; 342/357.13

(58) Field of Search ...................... 342/357.13, 357.09; 705/400, 418, 417; 701/200–217, 117, 120; 707/513; 365/200; 340/990, 995

(56) References Cited

U.S. PATENT DOCUMENTS

| | | | |
|---|---|---|---|
| 4,774,671 A | 9/1988 | Itoh et al. ................ | 364/449 |
| 4,774,672 A | 9/1988 | Tsunoda et al. ........... | 364/449 |
| 5,528,248 A | 6/1996 | Steiner et al. ............ | 342/357 |
| 5,537,324 A | 7/1996 | Nimura et al. ............ | 364/449 |
| 5,543,802 A | 8/1996 | Villevieille et al. ....... | 342/357 |
| 5,877,751 A | 3/1999 | Kanemitsu et al. ........ | 345/173 |
| 5,938,721 A | 8/1999 | Dussell et al. ............ | 701/211 |
| 5,948,040 A * | 9/1999 | DeLorme et al. .......... | 340/990 |
| 6,040,824 A | 3/2000 | Maekawa et al. .......... | 345/173 |
| 6,266,612 B1 | 7/2001 | Dussell et al. ............ | 701/207 |
| 6,317,684 B1 | 11/2001 | Roeseler et al. ........... | 701/202 |
| 6,317,686 B1 * | 11/2001 | Ran ........................ | 701/117 |
| 6,317,687 B1 | 11/2001 | Morimoto et al. ......... | 701/211 |
| 6,321,158 B1 | 11/2001 | DeLorme et al. .......... | 701/201 |
| 6,411,899 B2 | 6/2002 | Dussell et al. ............ | 701/211 |
| 2002/0013815 A1 * | 1/2002 | Obradovich et al. ....... | 709/204 |
| 2002/0052689 A1 * | 5/2002 | Yamashita et al. ......... | 701/211 |

OTHER PUBLICATIONS

"An optimal pathfinder for vehicles in real–world digital terrain maps", http://www.nease.net/jamsoft/shortestpath/pathfinder/4.html, 11 pages, (1999).
"Informed Search Methods", *Artificial Intelligence, A Modern Approach*, Prentice Hall, Inc., pp. 92–115, (1995).
"Real–Time Vehicle Routing in Dynamic and Stochastic Urbran Traffic Networks", http://www.gpu.srv.ualberta.ca/lfu/research.htm, pp. 1–3, (1997).
Ahuja, R., et al., "Faster Algorithms for the Shortest Path Problem", *Journal of the Association for Computing Machinery*, 37(2), pp. 213–223, (1990).
Cung, V., et al., "An Efficient Implementation of Parallel A*", *CFPAR*, Montreal, Canada, pp. 153–167, (1994).

(List continued on next page.)

*Primary Examiner*—Thomas G. Black
*Assistant Examiner*—Ronnie Mancho
(74) *Attorney, Agent, or Firm*—Devon A. Wolf

(57) ABSTRACT

Systems, devices and methods are provided to integrate navigation data, such as GPS navigation data, with Personal Digital Assistant (PDA) expense reporting functions to flexibly, accurately and efficiently determine travel distances for expense reports. One aspect provided herein is a method of using a Personal Digital Assistant (PDA) to provide travel expenses for an expense report. Navigation data is used to determine a travel distance, which is associated with a PDA expense report entry. In one embodiment, a procedure for determining a travel distance is selected. One procedure involves calculating a route between a starting location and an ending location. Another procedure involves determining a distance along a track log between the starting location and the ending location. Another procedure involves incrementing a counter to monitor a distance traveled from the starting location. Other aspects are provided herein.

45 Claims, 15 Drawing Sheets

OTHER PUBLICATIONS

Fredman, M., et al., "Fibonacci heaps and their uses in improved network optimization algorithms", *Journal of the ACM, 34(3)*, 2 pages, (1987).

Fu, L., "Heuristic Shortest Path Algorithms and their Potential IVHS Applications", *Proceedings of the Fourth University of Alberta—University of Calgary, Joint Graduate Student Symposium in Transportation Engineering*, pp. 83–109, (1995).

Ikeda, T., et al., "A Fast Algorithm for Finding Better Routes by AI Search Techniques", *Vehicle Navigation and Information Systems Conference Proceedings*, pp. 291–296, (1994).

Kaindl, H., et al., "Memory–Bounded Bidirectional Search", *Proceedings of the 12th National Conference on Art*, AAAI Press, Seattle, WA, pp. 1359–1364, (1994).

Laporte, G., "The Vehicle Routing Problem: An overview of exact and approximate algorithms", *European Journal of Operational Research, 59*, pp. 345–358, (1992).

Myers, B., "Data Structures for Best–First Search", http://www4.ncsu.edu/jbmyers/dsai.htm, pp. 1–6, (1997).

Ronngen, R., et al., "Parallel and Sequential Priority Queue Algorithms", *ACM Transactions on Modeling and Computer Simulation, 7(2)*, pp. 168–172, 198, 199, (1997).

Stout, B., "Smart Moves: Intelligent Pathfinding", *Gamasutra*, http:/www.gamasutra.com/features/programming/080197/pathfinding.htm, pp. 1–11, (1997).

Wai, L., et al., "Comparative Study of Shortest Path Algorithm for Transport Network", *USRP Report 2*, http://www.comp.nus.edu.sg/leonghoe/USRPreport–txt.hml, pp. 1–10, (1999).

Zhan, F.B., "Three Fastest Shortest Path Algorithms on Real Road Networks: Data Structures and Procedures", *Journal of Geographic Information and Decision Analysis, 1(1)*, http://www.geog.uwo.ca/gimda/journal/vol1.1/Zhan/Zhan.htm, 11 pages, (1997).

Zhao, Y., et al., "An Adaptive Route–Guidance Algorithm for Intelligent Vehicle Highway Systems", *American Control Conference, Boston, MA*, Department of Electrical Engineering and Computer Science, The University of Michigan, pp. 2568–2573, (1991).

* cited by examiner

1610
    ┌─────────┐                   ↙
    │ Expense │              ▽All
    └─────────┘
1640─┌──┐
     │12/11│ Mileage      mi ................
     └──┘
     12/21 Breakfast     $ 5.24 ............
    ┌─────────────────────────────────────┐
    │           Odometer            ⓘ     │
    │                              1650   │
    │                              ↙      │
1642─│ ☐ ☐ ☐ ☐ ☐ 0 . 0   (Start)           │
    │                                     │
    │  1644─ Start Date: — —              │
    │                                     │
    │  1646─ End Date: — —                │
    │                                     │
    │    1652   1659    1648              │
    │   (OK)  (Cancel) (Reset)            │
    └─────────────────────────────────────┘

FIG. 16

1710
    ┌─────────┐                    ↙
    │ Expense │              ▽All
    └─────────┘
1740─┌──┐
     │12/11│ Mileage      mi ................
     └──┘
     12/21 Breakfast     $ 5.24 ............
    ┌─────────────────────────────────────┐
    │           Odometer            ⓘ     │
    │                             1751    │
    │                              ↙      │
1742─│ ☐ ☐ ☐ 5 5 3 . 7   (Stop)            │
    │                                     │
    │   Start Date: 12/11/01  13:55       │
    │                                     │
    │   End Date: 12/11/01  23:12         │
    │                                     │
    │    1753                             │
    │   (Add)  (Cancel) (Reset)           │
    └─────────────────────────────────────┘

FIG. 17

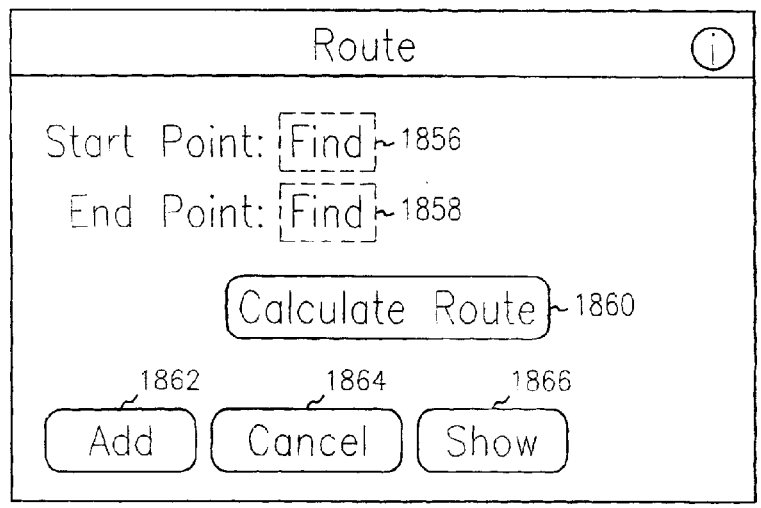
FIG. 18
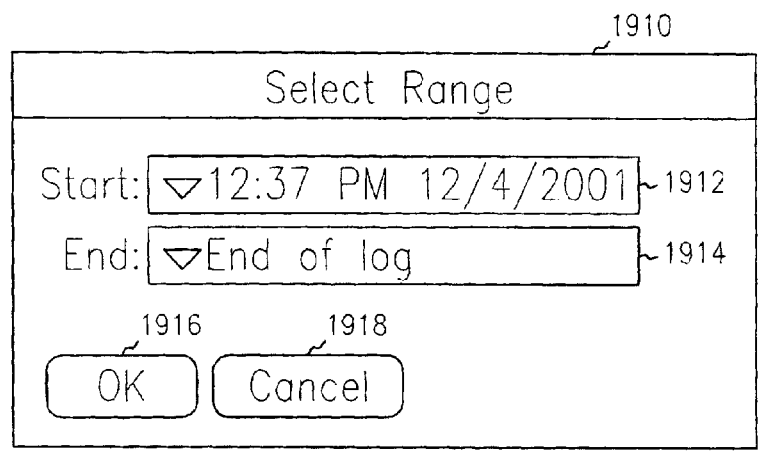
FIG. 19

```
Choose Exact Time...
Choose Location...
Beginning of Log

```
    Choose Exact Time
Start: [    ]      [    ]
        Time        Date

End:   [    ]      [    ]
        Time        Date
```

FIG. 21

PDA WITH INTEGRATED NAVIGATION FUNCTIONS AND EXPENSE REPORTING

CROSS REFERENCE TO RELATED APPLICATIONS

This application is related to the following co-pending, commonly assigned U.S. patent application. "System and Methods For Track Log Selection," Ser. No. 10/071,560, and "PDA With Integrated Address Book and Electronic Map Waypoints," Ser. No. 10/032,032, both of which are herein incorporated by reference in their entirety.

FIELD OF THE INVENTION

The present invention relates generally to Personal Digital Assistants (PDAs) and, more particularly, to PDA expense reporting functions.

BACKGROUND OF THE INVENTION

PDAs are small, substantially hand-held computers that are used for storing, manipulating and retrieving data. One example of a PDA is the Palm Pilot® manufactured by 3Com Corporation. PDAs provide a variety of functions, such as an electronic day planner, an address book, a "to do" list, a memo pad, and expense reporting.

Navigation systems and devices are known. Such navigation systems and devices are capable of calculating a route between two locations. Electronic navigation devices employing Global Positioning System ("GPS") receivers are known. The GPS includes a plurality of satellites that are in orbit about the Earth. The orbit of each satellite is not necessarily synchronous with the orbits of other satellites and, in fact, is likely asynchronous. The GPS receiver device receives spread spectrum GPS satellite signals from the various satellites. The spread spectrum signals continuously transmitted from each satellite utilize a highly accurate frequency standard accomplished with an extremely accurate atomic clock. Each satellite, as part of its data signal transmission, transmits a data stream indicative of that particular satellite. The GPS receiver device acquires spread spectrum GPS satellite signals from at least three satellites to calculate its two-dimensional position by triangulation. Acquisition of an additional signal, resulting in signals from a total of four satellites, permits the GPS receiver device to calculate its three-dimensional position. In this manner, an electronic navigation device employing a GPS receiver has the ability to accurately compute the position of the device in real time, even as the device moves. One example of an electronic navigation device is the eMAP portable electronic map manufactured by Garmin International.

Plug-in GPS receiver modules for PDAs are known. There are problems associated with various plug-in GPS receiver modules and PDAs. One problem is that a PDA with a plug-in GPS receiver module is cumbersome to handle and use. Two separate devices must be handled. Another problem is that plug-in GPS receiver modules do not function together with the PDA to provide integrated PDA features.

There exists a need for a PDA that incorporates GPS receiver technology within a single module. There exists a need to integrate navigation functions and GPS capabilities into PDA functions without causing the GPS-capable PDA to be cumbersome to handle or use.

SUMMARY OF THE INVENTION

The present invention addresses problems with integrating GPS receiver technology into a PDA, and will be understood by reading and studying the following specification. The systems, devices and methods of the present invention integrate GPS capabilities with PDA functions. In particular, the systems, devices and methods of the present invention integrate PDA expense reporting functions with navigation functions and data, such as GPS navigation functions and data, to flexibly, accurately and efficiently determine travel distances for expense reports.

One aspect provided herein is a method of using a Personal Digital Assistant (PDA) to provide travel expenses for an expense report. Navigation data is used to determine a travel distance, and the travel distance is associated with a PDA expense report entry. In one embodiment, a procedure for determining a travel distance is selected. One procedure involves calculating a route between a starting location and an ending location. Another procedure involves determining a distance along a track log between the starting location and the ending location. Another procedure involves incrementing a counter to monitor a distance traveled from the starting location.

One aspect provided herein is a Personal Digital Assistant (PDA) device with an integrated electronic map and expense report. The PDA device includes a processor and a memory that is adapted to communicate to the processor. The memory of the PDA device includes navigation data, expense report data, and computer-executable instructions. The computer-executable instructions are adapted to identify a travel distance from the navigation data, and to associate the travel distance with the expense report data. As such, the PDA device is capable of being used to generate expense reports based on travel distances determined from navigation data.

These and other aspects, embodiments, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 14 illustrates a known interface representing an Expense Receipt Details Page for a "Mileage" expense type;

FIG. 15 illustrates one example of an interface representing an Expense Receipt Details Page for a "Mileage" expense type according to the present invention;

FIG. 16 illustrates one example of an interface representing an Odometer Page in which the odometer has been reset;

FIG. 17 illustrates one example of an interface representing an Odometer Page in which the odometer has monitored a travel distance;

FIG. 18 illustrates one example of an interface representing a Route Calculator Page for determining a travel distance;

FIG. 19 illustrates one example of an interface representing a Track Log Page for determining a travel distance by selecting a range of the track log;

FIG. 20 illustrates one example of a pop-up or pull-down menu for the start time selected within the interface of FIG. 19;

FIG. 21 illustrates one example of an interface for choosing an exact time;

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to systems, devices and methods for integrating GPS receiver technology into a PDA and for integrating capabilities associated with GPS and navigation technologies with PDA functions. The present invention integrates navigation functions and data, such as GPS navigation functions and data, with Personal Digital Assistant (PDA) expense reporting functions to flexibly, accurately and efficiently determine travel distances for expense reports.

Figures 1A, 1B:
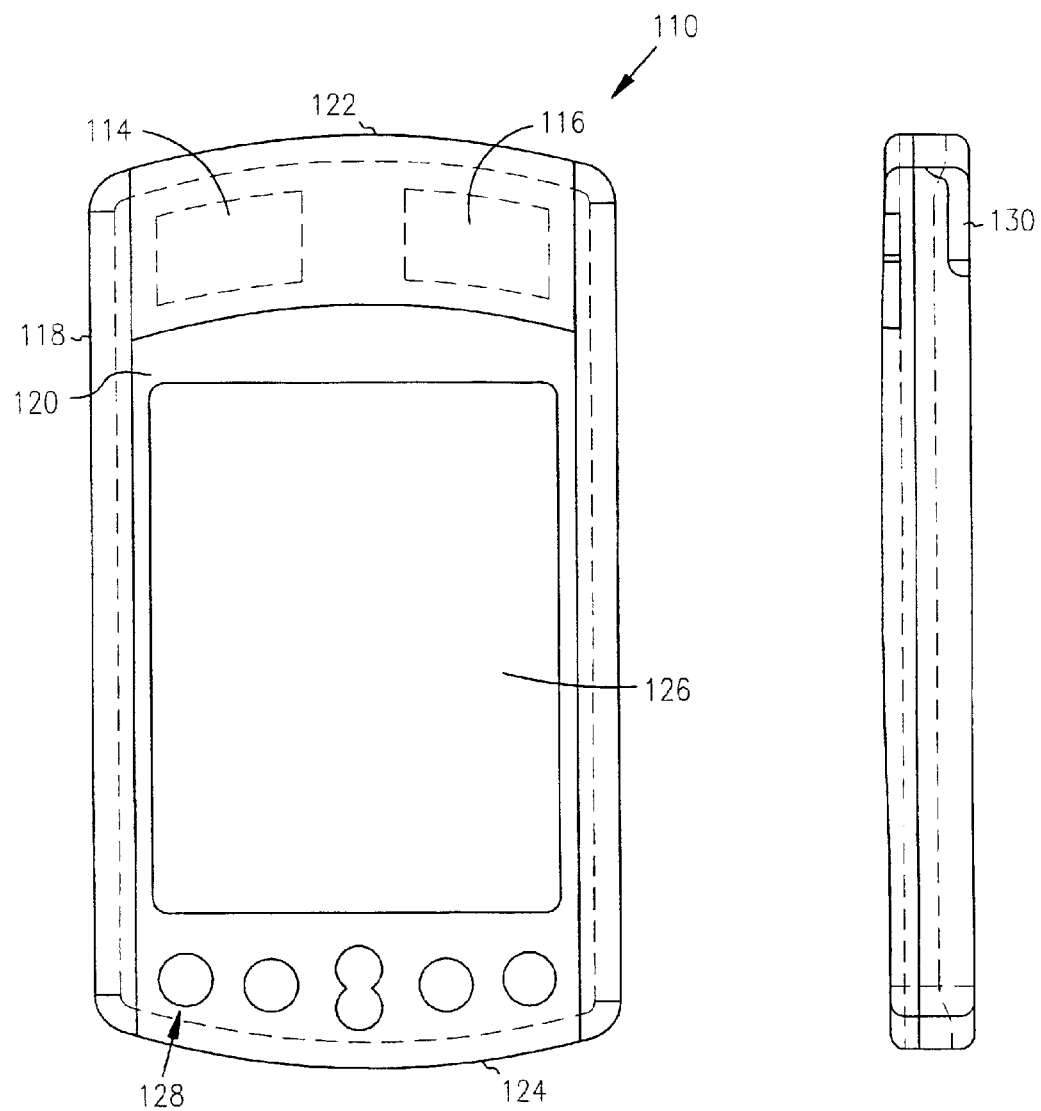
FIG. 1A is a front view of a PDA with integrated GPS receiver according to the present invention.
FIG. 1B is a side view of the PDA shown in FIG. 1.
Figure 1C:
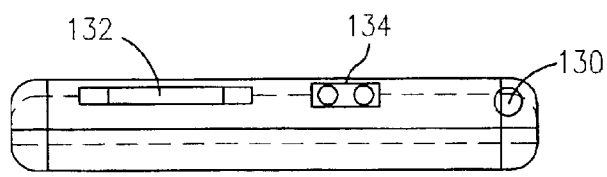
FIG. 1C is a top end view of the PDA shown in FIG. 1.

FIGS. 1A–1C illustrate views for a Personal Digital Assistant (PDA) with integrated Global Positioning System (GPS) receiver according to the teachings of the present invention. The GPS integrated PDA operates with an operating system (OS) such as, for example, the well-known Palm or Pocket PC operating systems, or the currently lesser-used Linux OS.

As shown in the front view of FIG. 1A, the GPS integrated PDA 110 includes a GPS antenna, illustrated in this embodiment as an internal integrated GPS patch antenna 114 contained within a housing 118. As one of ordinary skill in the art will understand, the antenna can include other antenna designs such as a helical GPS antenna. The invention is not so limited. The housing 118 in the illustrated embodiment is generally rectangular with a low profile and has a front face 120 extending from a top end 122 to a bottom end 124. Mounted on front face 120 is a display screen 126, which is touch sensitive and responsive to a stylus 130 (shown stored in the side view of FIG. 1B) or a finger touch. FIGS. 1A–1C illustrate the stylus 130 nested within housing 118 for storage and convenient access in a conventional manner.

The embodiment shown in FIG. 1A illustrates a number of control buttons, or input keys 128 positioned toward the bottom end 124. The invention, however, is not so limited and one of ordinary skill in the art will appreciate that the input keys 128 can be positioned toward the top end 122 or at any other suitable location.

The end view of FIG. 1C illustrates a map data cartridge bay slot 132 and headphone jack 134 provided at the top end 122 of the housing 118. Again, the invention is not so limited and one of ordinary skill in the art will appreciate that a map data cartridge bay slot 132 and headphone jack 134 can be provided at the bottom end 124, separately at opposite ends, or at any other suitable location.

One embodiment of the GPS integrated PDA 110 has the capability to wirelessly communicate with other PDAs or with other systems using a variety of wireless communication technology, such a satellite, radio frequency, microwave frequency and infrared communication, and the like. One embodiment of the GPS integrated PDA 110 includes a cellular transceiver 116 contained in the housing 118. The cellular transceiver is used in cellular communication technology, such as time division multiple access (TDMA), frequency division multiple access (FDMA), code division multiple access (CDMA), global system for mobile communications (GSM), and the like. According to various embodiments, the wireless communication includes digital and analog signals. According to various embodiments, these signals are modulated, encrypted and/or compressed signals as may be desirable for the communication technology.

Figure 2:
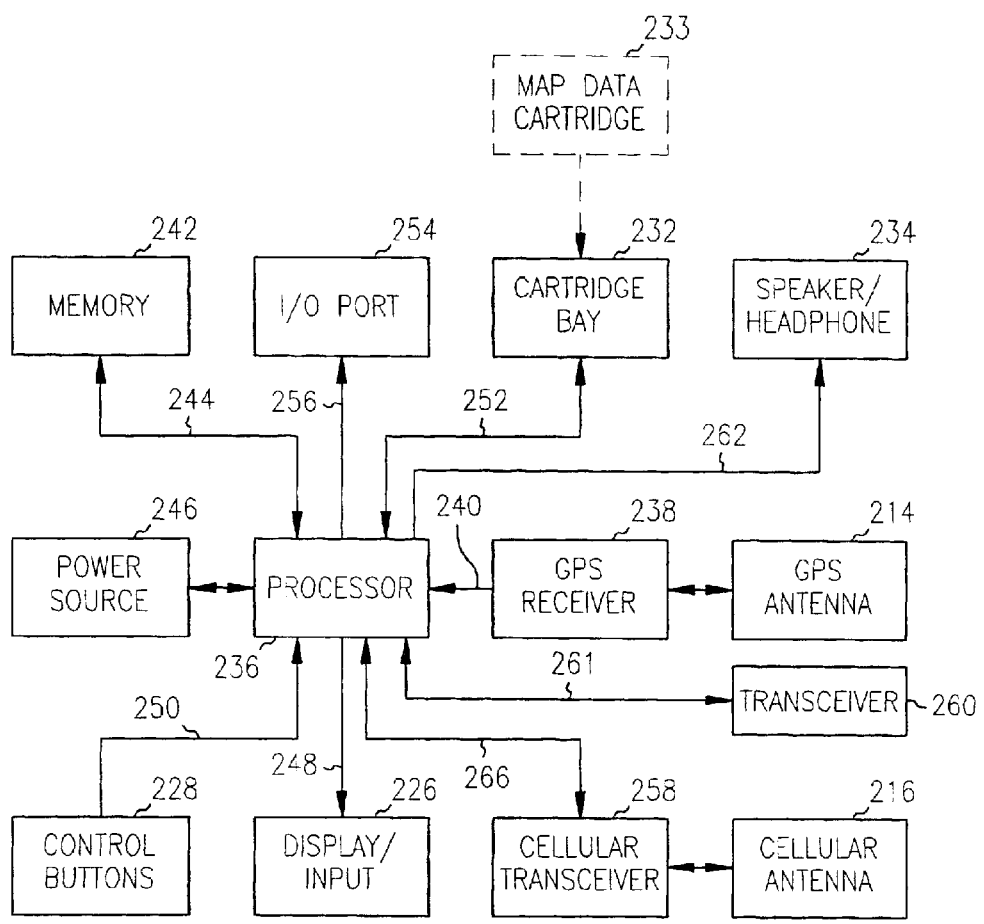
FIG. 2 is a block diagram of components in one PDA embodiment.

FIG. 2 is a block diagram of components in one PDA embodiment. The electronic components include a processor 236 which is connected to the GPS antenna 214 through GPS receive 238 via line 240. The processor 236 interacts with an operating system (such as PalmOS; Pocket PC) that runs selected software depending on the intended use of the PDA. Processor 236 is coupled with memory 242 such as RAM via line 244, and power source 246 for powering the electronic components of the PDA. The processor 236 communications with touch sensitive display screen 226 via data line 248.

The electronic components further include other input sources that are connected to the processor 236. Control buttons 228 are connected to processor 236 via line 250 and a map data cartridge 233 inserted into cartridge bay 232 is connected via line 252. A conventional serial I/O port 254 such as a USB port is connected to the processor 236 via line 256. Cellular antenna 216 is connected to cellular transceiver 258, which is connected to the processor 236 via line 266. Processor 236 is connected to the speaker/headphone jack 234 via line 262. One embodiment of the PDA includes an infrared port (not explicitly shown but is generally shown as transceiver 260) coupled to the processor 236 that may be used to beam information from one PDA to another, as will be explained in more detail below.

The electronic components include a memory 242, which is adapted to store and/or house a set of executable instructions, programs, and/or program modules. The memory 242 is adapted to communicate with the processor 236 via line 244. The memory 242 is further adapted to store or house navigation-related data and is adapted to house or store software operable to perform various algorithms such as algorithms for generating track logs, for monitoring a distance traveled, and for calculating, routes. Examples of routing algorithms include, but are not limited to, routing algorithms as described in commonly assigned application entitled; "Systems and Methods for a Navigational Device with Improved Route Calculation Capabilities," application Ser. No. 10/028,057, now U.S. Pat No. 6,545,637 "Systems and Methods for a Navigational Device with Forced Layer Switching Based on Memory Constraints," application Ser. No. 10/027,159, now U.S. Pat. No. 6,581,003 "Systems and Methods for a Navigational Device with Device with Automated Next Turn Page," application Ser. No. 10/029,917, "Systems and Methods for a Navigational Device with Voice Guidance," application Ser. No. 10/029,732, and "Systems and Methods for a Navigational Device with Detour Routing Capabilities," application Ser. No. 10/028,343, now U.S. Pat. No. 6,687,615 incorporated herein in full by reference.

The navigation-related data includes cartographic data. The cartographic data includes a number of locations and data indicative of throughfares of a plurality of types connecting certain ones of the locations. In embodiment, the navigation-related data includes a calculated route between at least two of the number of locations. Further, according to the teachings of the present invention, the software stored or housed within memory 242 includes software operable to perform one or more applications for navigation. As used herein, software operable to perform one or more applications for navigation includes, but is not limited to, software operable to find points of interest, to calculate a route and determine a travel distance from the route, to maintain a track log and determine a travel distance from the track log, and to monitor travel from a location. In various embodiments, the navigation-related data includes, but is not limited to, various combinations of map features, waypoints, planned routes, points of interest, location data, and/or track logs. In various embodiments, the points of interest include geographical points of interests, entertainment venues, dining venues, historical points of interest, and/or lodging venues. In various embodiments, the navigation-related data include automobile navigation data, marine craft navigation data, pedestrian navigation data, and/or hiking navigation.

The electronic components include a transceiver 260 coupled to the processor 236 via line 261. As stated above, the memory 242 is adapted to store or house software. According to the teachings of the present invention, software is provided which includes a set of executable instructions, programs, and or program modules adapted to control transceiver 260 such that the transceiver 260 is capable of transmitting and receiving navigation data between a handheld electronic device and an other portable and/or handheld device. For example, in one embodiment, the software includes a set of executable instructions adapted to transmit and receive the navigation related data via a commercial communications network. One example of a commercial communications network includes an analog cellular network using plain old telephone service (POTS). Another example of a commercial communications network to which the present invention is adapted includes a digital packet switched cellular network such as a personal communications service (PCS) network. In one embodiment, the transceiver 260 of the present invention is adapted to transmit and receive navigation related data via the Internet using Internet Protocol (IP). Thus, the present invention includes a handheld electronic device which is adapted to transmit and receive navigation related data over a wide area network (WAN) using any number or combination of hardwired and/or wireless communication channels. For instance, the transceiver of the present invention is adapted to transmit and receive navigation related data using a wireless application protocol (WAP). However, as one of ordinary skill in the art will understand upon reading and comprehending this disclosure, the invention is not limited to single one or particular combination of WAN communication channels or protocols. That is, the transceiver is capable of being instructed to transmit and receive navigation-related data in a 3G GSM/CDMA network, and the like.

Similarly, according to the teachings of the present invention, the transceiver 260 is adapted to transmit and receive navigation related data over a local area network (LAN). In this embodiment, the transceiver 260 is adapted to operate in a short range network and wirelessly transmit and receive the navigation related data between a handheld electronic device and another portable and/or handheld electronic device using infrared signaling and/or a Bluetooth signaling technology.

The electronic components shown in FIG. 2 are powered by a power source 246 in a conventional manner. As will be understood by one of ordinary skill in the art, different configurations of the components shown in FIG. 2 are considered within the scope of the present invention. For example, in one embodiment, the components shown in FIG. 2 are in communication with one another via wireless connections and the like. Thus, the scope of the navigation device of the present invention includes a portable electronic navigational aid device.

Figure 3:
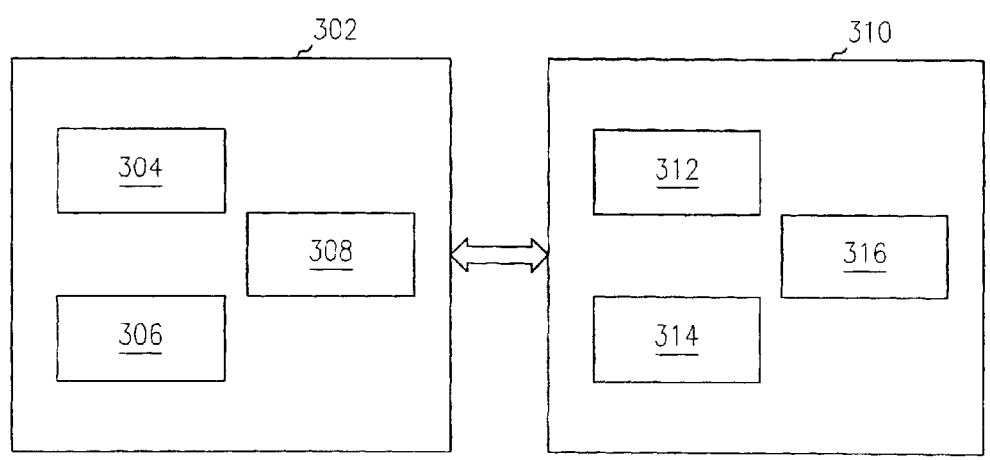
FIG. 3 is a block diagram of one embodiment for a system according to the present invention.

FIG. 3 is a block diagram of one embodiment for a system according to the present invention. The system includes a number of thin clients, such as thin clients 302 and 310. One definition of a thin client is a relatively low-cost computing device that works in a service-centric computing model, and is capable of operating in an application server environment. Thin clients do not require state-of-the-art, powerful processors and large amounts of RAM and ROM because they access applications and/or data from a server or network. As used herein, thin clients include, but are not limited to, cell phones, PDAs, laptop computers, intelligent apparel, and the like.

As one of ordinary skill in the art will understand upon reading this disclosure, the first thin client 302 and the second thin client 310 are capable of including electronic components such as those described in detail above in connection with FIG. 2. The first thin client 302 includes a processor 304, a memory 306, and a transceiver 308 adapted to communicate with one another, and the second thin client 310 includes a processor 312, a memory 314, and a transceiver 316 adapted to communicate with one another. The memory 306 and 314 are adapted to store navigation-related data and software/instructions as described above in connection with FIG. 2.

The transceivers 308 and 316 in the first and the second thin clients 302 and 310 are adapted to transmit and receive the navigation-related data wirelessly between the first and the second thin clients 302 and 310, as previously explained and described in detail above in connection with FIG. 2. That is, the transceivers 308 and 316 are adapted to transmit and receive the navigation-related data wirelessly using a communication technology such as infrared signaling, cellular technology (whether digital and/or analog), Bluetooth technology, or microwave technology over LANs/WANs. In one embodiment, the navigation-related data includes, but is not limited to, automobile navigation data, marine craft navigation data, pedestrian navigation data, and/or hiking navigation data. In one embodiment, at least one of the first and the second thin clients 302 and 310 includes a GPS enabled handheld device such that the position of the device is capable of being determined using GPS technology.

The first and the second thin client 302 and 310 are capable of transmitting, receiving, and/or operating on navigation-related data. For example, in one embodiment, the first and the second thin client 302 and 310 are adapted to transmit and receive a calculated route between each other, to track the location of the other thin client using GPS technology, for example, and to monitor travel of the other thin client. These functions will be described in more detail below with respect to FIGS. 7-25. Other navigation-related data is capable of being operated on, and is capable of being transmitted and received between the thin clients 302 and 310.

Figure 4:
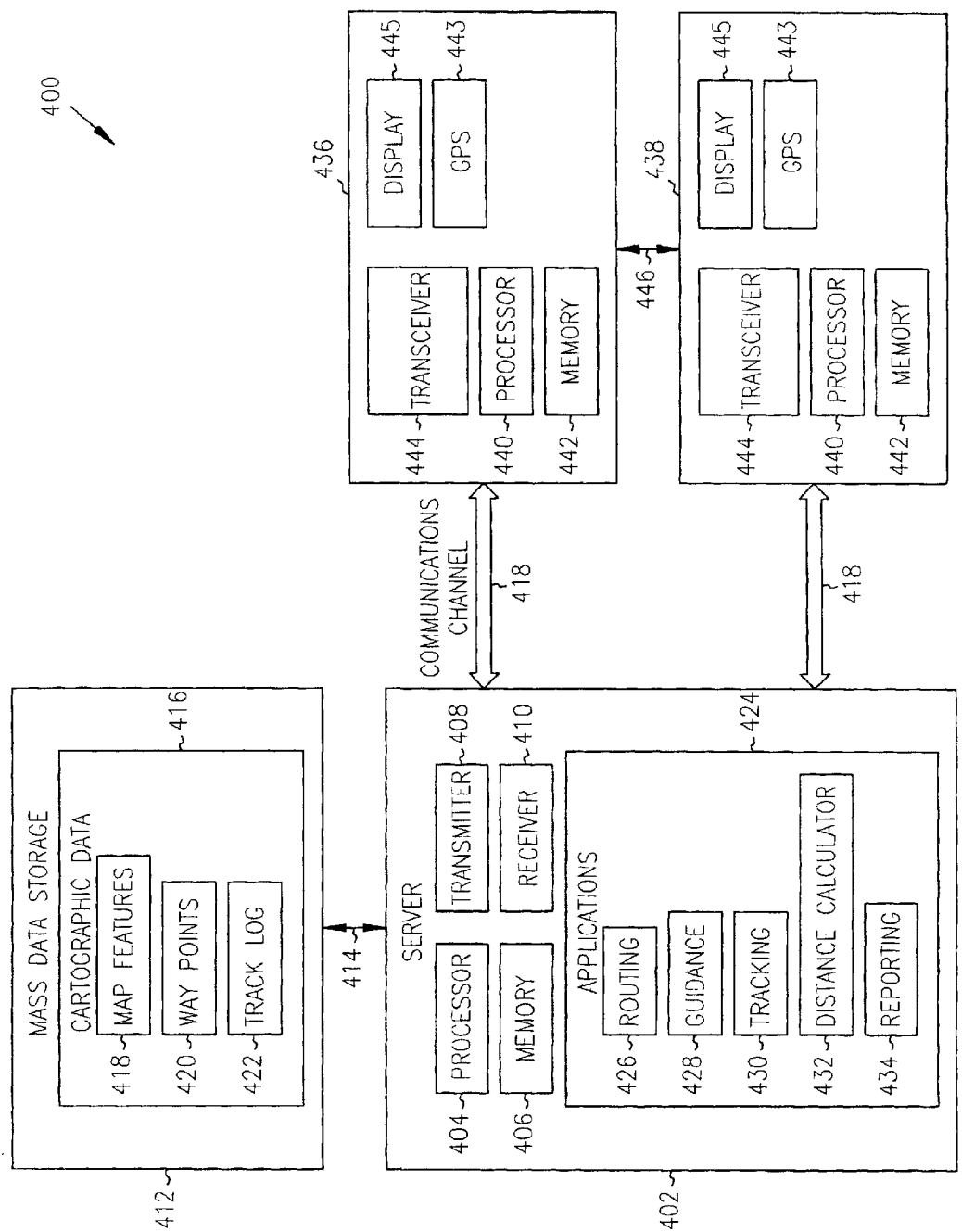
FIG. 4 is a block diagram of another embodiment for a system according to the present invention.

FIG. 4 is a block diagram of another embodiment for a system according to the present invention. The navigation system 400 includes a server 402. According to one embodiment, the server 402 includes a processor 404 operably coupled to memory 406, and further includes a transmitter 408 and a receiver 410 to send and receive data, communication, and/or other propagated signals. The transmitter 408 and receiver 410 are selected or designed according to the communication requirements and the communication technology used in the communication design for the navigation system 400. The functions of the transmitter 408 and the receiver 410 are capable of being combined into a single transceiver.

The navigation system 400 further includes a mass data storage 412 coupled to the server 402 via communication link 414. The mass data storage 412 contains a store of navigation data and/or cartographic data 416, such as map features 418, waypoints 420, and track logs 422 for one or up to a large number of users. One of ordinary skill in the art will understand, upon reading and comprehending this disclosure, that the mass data storage 412 can be separate device from the server 402 or can be incorporated into the server 402. The server 402 is capable of performing various applications 424 or services using this cartographic data 416. According to various embodiments, these applications 424 include a routing application 426, a guidance application 428, a tracking application 430, a distance calculator 432 and an expense reporting application 434. These applications generally provide functions, and these functions will be described in more detail below with respect to FIGS. 7-25.

In one embodiment of the present invention, the navigation system 400 further includes a first and second thin client or PDA 436 and 438 adapted to communicate with the server 402 through the communication channel 418. The communication channel 418 is the propagating medium/media or path that connects the thin clients or PDAs 436 and 438 to the server 402. According to one embodiment, the thin clients or PDAs 436 and 438 include a processor 440 and memory 442, as previously shown and described with respect to the block diagram of FIG. 2. Furthermore, the thin clients or PDAs 436 and 438 include a transceiver 444 to send and receive communication signals through the communication channel 418 to the server 402 and/or to send and receive communication signals to each other though channel 446. The transceivers 444 are selected or designed according to the communication requirements and the communication technology used in the communication design for the navigation system. Each of the transceivers 444 are capable of being two separate transceivers to communicate through different communication medium, such as that which may be present for channel 418 and 446. The first and second thin clients or PDAs 436 and 438 are further illustrated to include GPS receiver technology 443 and a touch-sensitive display 445, which are adapted to communicate with the processor 440.

Software stored in the server memory 406 provides instructions for the processor 404 and allows the server 402 to provide services, such as applications 424, to the thin clients 436 and 438. One service provided by the server 402 involves processing requests from the thin clients/PDAs 436 and 438 and transmitting navigation data from the mass data storage 412 to the thin clients/PDAs 436 and 438. According to one embodiment, another service provided by the server 402 includes processing the navigation data using various algorithms for a desired application, and sending the results of these calculations to the thin clients/PDAs 436 and 438. Another service provided by the server is determining a travel distance of the thin clients/PDAs 436 and 438, and appropriately associating the travel distances with expense report entries. These and other features of these services or applications will become apparent to one or ordinary skill in the art upon reading and understanding the description provided below with respect to FIGS. 7-25.

The communication channel 418 is not limited to a particular communication technology. Additionally, the communication channel 418 is not limited to a single communication technology; that is, the channel 418 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 418 includes telephone and computer networks. Furthermore, in various embodiments, the communication channel 418 is capable of accommodating wireless communication such as radio frequency, microwave frequency and infrared communication, and the like. Additionally, according to various embodiments, the communication channel 418 accommodates satellite communication.

The communication signals transmitted through the communication channel 418 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like that are now known or hereinafter developed. Both digital and analog signals may be transmitted through the communication channel 418. According to various embodiments, these signals are modulated, encrypted and/or compressed signals as may be desirable for the communication technology.

According to the teachings of the present invention, communication channel 446 is the propagating medium/media or path that connects the one or more thin clients to each other. According to one embodiment, the transceiver 444 is adapted to transmit and receive the navigation-related data wirelessly using a communication technology such as infrared signaling, cellular technology (whether digital and/or analog), Bluetooth technology, microwave technology over LANs/WANs, and the like.

The mass data storage 412 includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system 400, the server 402 includes a remote server accessed by the thin client/PDA 436 through a wireless channel. According to other embodiments of the navigation system, the server 402 includes a network server located on a local area network (LAN), wide area network (WAN), a virtual private network (VPN) and server farms.

According to another embodiment of the navigation system, the server 402 includes a personal computer such as a desktop or laptop computer. In one embodiment, the communication channel 418 is a cable connected between the personal computer and the thin client/PDA 436. According to one embodiment, the communication channel 418 is a wireless connection between the personal computer and one or more of the thin client/PDA 436.

Figure 5:
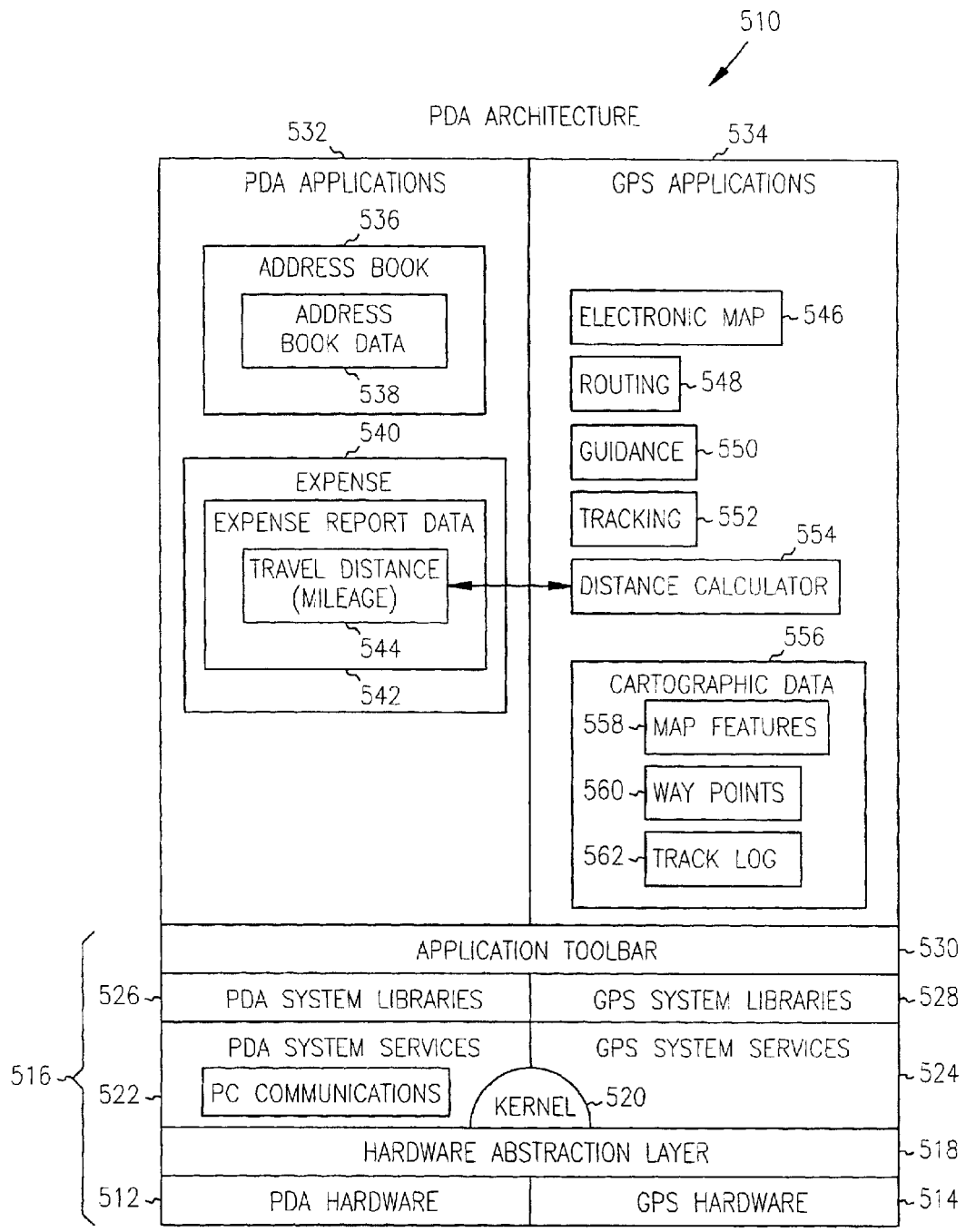
FIG. 5 is a representation of a PDA architecture according to the present invention.

FIG. 5 is a representation of a PDA architecture according to the present invention. The PDA architecture is denoted generally by reference numeral 510. The PDA architecture includes PDA hardware 512, and is capable of including third party, OEM hardware such as GPS hardware 514. An operating system 516 operates on the hardware.

One of ordinary skill in the art will understand the operation and function of an operating system. A brief overview is provided here to assist the reader. One definition of an operating system is software that provides hardware control and user interaction. An operating system can be viewed as being divided into a loader, a kernel and utilities. These portions of the operating system are not illustrated, as such, in the PDA architecture 510 of FIG. 5. A responsibility of the loader is, upon power up, loading the kernel of the operating system into memory and transferring control to the kernel. Tasks performed by the kernel of the operating system include controlling hardware, such as hardware initializations, and controlling some software initializations like internal data structures. The kernel also is able to set predetermined entry points to trusted code. The utilities are the outer layer of the operating system, which depend on kernel entry points to do hardware accesses. The utilities invoke other programs and transfer control to them. The operating system 516 is shown generally in FIG. 5 as those components in the PDA architecture 510 that provide hardware control.

FIG. 5 illustrates various layers on other layers. One of ordinary skill in the art will understand how these layers related with each other to provide an operable PDA. In the illustration shown in FIG. 5, a hardware abstraction layer 518 is illustrated on the hardware 512 and 514, and a kernel 520 is illustrated on the hardware abstraction layer 518. Both conventional PDA system services 522 and third party, OEM system services such as GPS services 524 are positioned on the hardware abstraction layer 518 on the kernel 520. PDA system libraries 526 are illustrated on the PDA system services 522 and third party, OEM system libraries 528 such as GPS system libraries are illustrated on the GPS system services 524. An application toolbar 530 is illustrated on the PDA system libraries 526 and the GPS system libraries 528. Various PDA applications 532 and GPS applications 534 can be launched from the application tool bar 530. PDA applications 532 include applications such as an address book application 536 and associated address book data 538, and expense reporting applications 540 and associated expense report data 542. One example of expense report data includes travel distance data 544 (such as mileage data). GPS applications include applications such an electronic map application 546, a routing application 548, a guidance application 550, a tracking application 552, a distance calculator 554, and associated cartographic data 556. This cartographic data 556, which also may be referred to here as navigation data, is capable of including map features 558, waypoints 560 and track logs 562. According to one embodiment, portions of the cartographic data 556 is provided on a map data cartridge such as the map data cartridge 233 shown in FIG. 2. According to one embodiment, the cartographic data 556 is provided, at least in part, by a server through a wireless communication channel such as that shown in FIG. 4. According to one embodiment, the calculations associated with routing and guidance applications are provided, at least in part, by a server and are communicated to the PDA through a wireless communication channel. One of ordinary skill in the art will recognize that the integration of GPS capabilities into the PDA architecture 510 can be accomplished at the hardware level 514, the system services level 524, the system library level 528, and/or the applications level 534.

According to one embodiment, which is discussed in more detail below with respect to FIG. 6, the PDA Address Book application 536 is capable of being used to identify locations or waypoints. According to the present invention, these identified locations are capable of being used to calculate a route between the locations, identify endpoints of a track log, and/or identify a starting location from which to monitor travel. That is, a distance is capable of being determined from one or more of these address-determined locations using distance calculator 554. This distance is capable of being associated with a travel distance 544 for an expense reporting application 540.

Figure 6:
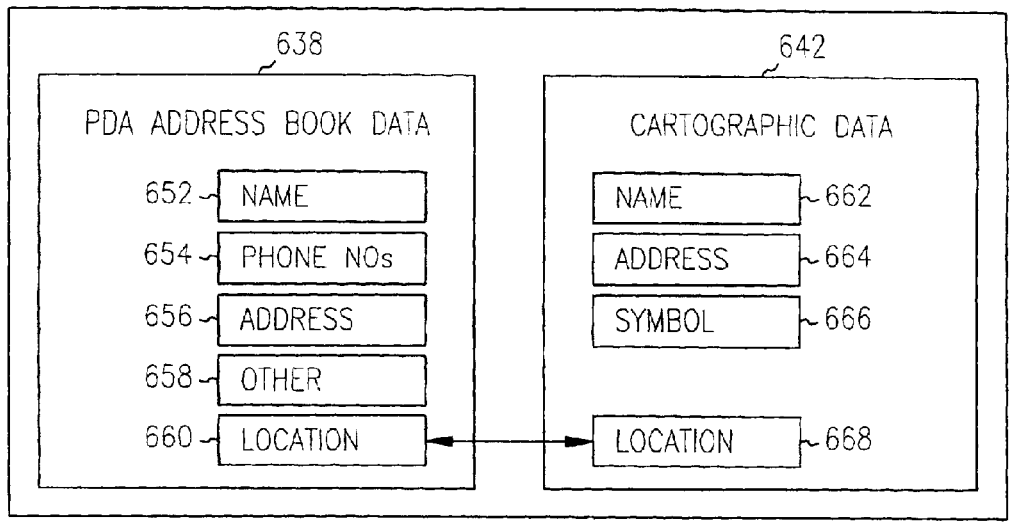
FIG. 6 is a representation of linked PDA address book data and electronic map data according to the present invention.

FIG. 6 is a representation of linked PDA address book data and electronic map data according to the present invention. PDA address book data 638 includes a number of fields, such as a Name Field 652, a Phone Number field 654, an Address Field 656, Other or Custom Fields 658, and the like. A custom field is capable of being implemented to store a variety of information as desired by the user. Data contained in these fields are grouped together and associated with a PDA address book entry. In one embodiment, electronic map data 642 includes fields such as a Name Field 662, an Address Field 664, a Symbol Field 666 associated with a location, location coordinates 668, and the like. As used herein, one definition of a waypoint is a location associated with a Name Field and a Symbol Field. For example, a waypoint can be used to calculate routes or to store location information for an electronic map. Additionally, waypoints are capable of being displayed on electronic maps using representative symbols to designate markers or turns. One embodiment of the present invention associates PDA address book entries and the electronic map data. That is, the present invention is capable of associating a position (via latitude and longitude coordinates, for example) to an address book entry such that a position can be determined from an address and an address can be determined from a position. In one embodiment, the present invention adds location information into a location field 660 in the PDA address book entry, and uses this location field to associate the address book entry to the electronic map data. In one embodiment, the location field 660 is a modified Other or Custom Field 658 found in a conventional PDA address book, and a data string that identifies a location is stored in the Custom Field 658.

Figure 7:
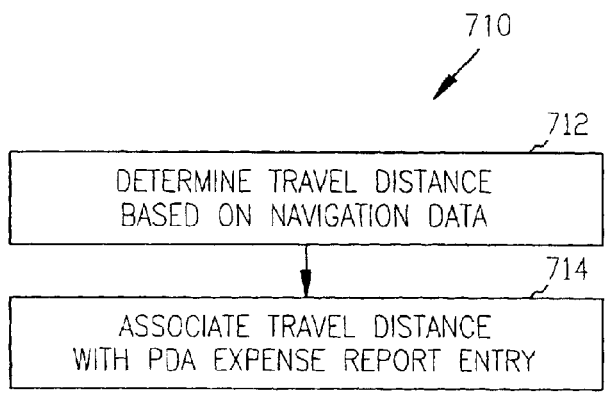
FIG. 7 is a flow diagram of one method embodiment for associating a travel distance with a PDA expense report entry according to the present invention.

FIG. 7 is a flow diagram of one method embodiment for associating a travel distance with a PDA expense report entry according to the present invention. The method embodiment is shown generally with the reference 710. At 712, a travel distance is determined based on navigation data. The navigation data includes, but is not limited to, actual position data for the PDA, such as that which may be determined using GPS technology, and calculated route data. The calculated route data is capable of including starting and ending points, along with other data, from which a route can be calculated and stored. At 714, the determined travel distance is associated with a PDA expense report entry. One of ordinary skill in the art will understand that the PDA expense report entry is capable of being used to create a PDA expense report within the PDA, and is capable of being exported to an external electronic device which uses the PDA expense report entry to generate an expense report.

Figure 8:
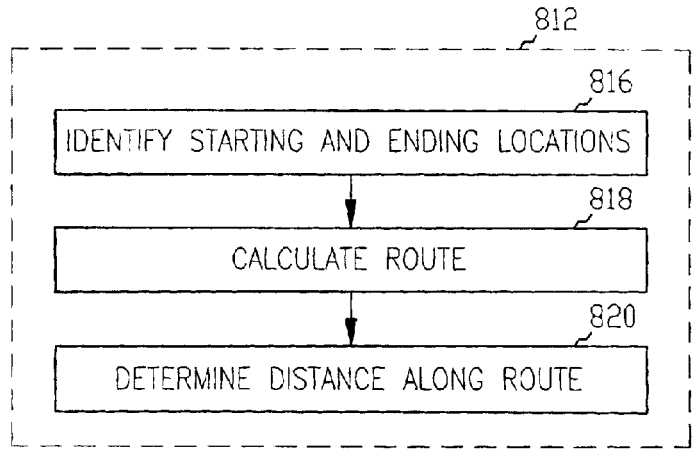
FIG. 8 is a flow diagram illustrating one process for determining travel distance based on navigation data according to the present invention as shown in FIG. 7.

FIG. 8 is a flow diagram illustrating one process for determining travel distance based on navigation data according to the present invention as shown in FIG. 7. The dotted line box 812 of FIG. 8 generally corresponds to the reference 712 shown in FIG. 7. As such, the following process represents one embodiment for determining travel distance based on navigation data. Starting and ending locations are identified at 816. According to various embodiments, one or both of these locations are capable of being identified using waypoints, addresses and/or map features. One embodiment provides the capability of manually entering coordinates for the starting and ending locations. One embodiment provides the capability to manually select a location on an electronic map by, for example, selecting a position with a cursor or by tapping on a touch sensitive screen. At 818, a route is calculated based on cartographic data and the identified starting and ending locations. A distance is determined along the route at 820. This distance is capable of being associated with the PDA expense report entry as represented at 714 FIG. 7. The process represented by FIG. 8 can be considered to be a Route Calculating mode of operation. This mode of operation does not require the determination of an actual position of the PDA, as an operator is able to select the starting and ending points from cartographic data.

Figure 9:
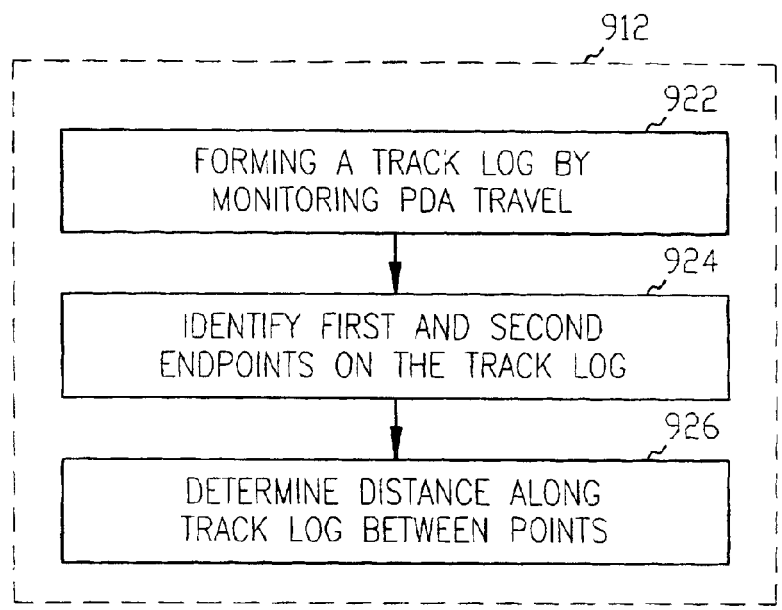
FIG. 9 is a flow diagram illustrating one process for determining travel distance based on navigation data according to the present invention as shown in FIG. 7.

FIG. 9 is a flow diagram illustrating one process for determining travel distance based on navigation data according to the present invention as shown in FIG. 7. The dotted line box 912 of FIG. 9 generally corresponds to the reference 712 shown in FIG. 7. As such, the following process represents one embodiment for determining travel distance based on navigation data. At 922, a track log is formed by monitoring PDA travel and recording track log data points that represent the PDA travel. First and second endpoints for a desired track log segment are identified at 924 such that the desired track log segment is capable of being determined from the first and second endpoints, and from the track log data points that make up the track log segment formed at 922. The travel distance along the desired track log segment between the first and second endpoints is determined at 926. This distance is capable of being associated with the PDA expense report entry as represented at 714 in FIG. 7. The process represented by FIG. 9 can be considered to be a Tracking mode of operation. This mode of operation determines the actual position of the PDA, using GPS technology for example, to generate the track log data points.

Figure 10:
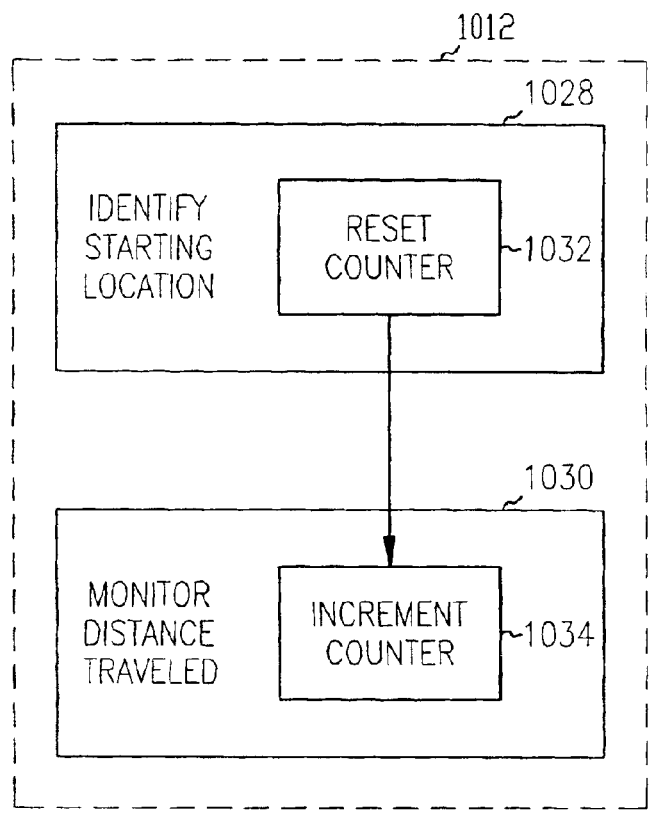
FIG. 10 is a flow diagram illustrating one process for determining travel distance based on navigation data according to the present invention as shown in FIG. 7.

FIG. 10 is a flow diagram illustrating one process for determining travel distance based on navigation data according to the present invention as shown in FIG. 7. The dotted line box 1012 of FIG. 10 generally corresponds to the reference 712 shown in FIG. 7. As such, the following process represents one embodiment for determining travel distance based on navigation data. At 1028, a starting location is identified. This starting location corresponds to a starting position for the PDA from which the travel of the PDA is monitored. At 1030, the distance traveled by the PDA is monitored. According to one embodiment, the starting location is identified by resetting a counter at 1032, and the distance traveled is monitored by incrementing the counter at 1034. For example, one embodiment increments the counter for every tenth of a mile traveled from the previous location. One of ordinary skill will understand that other counter increments are available and desirable based on a particular application of the present invention. The process represented by FIG. 10 can be considered to be a Taxi Meter mode of operation. This mode of operation determines the actual position of the PDA, using GPS technology for example, to determine when the PDA has traveled a predetermined distance interval such that the counter should be incremented.

Figure 11:
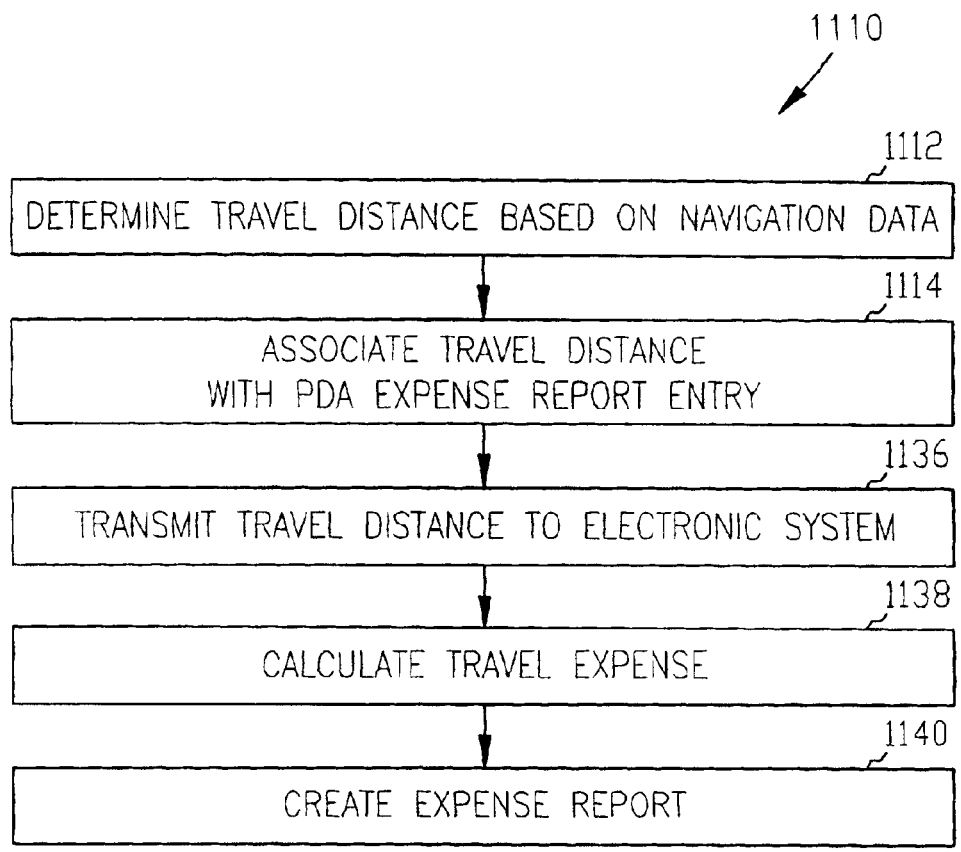
FIG. 11 is a flow diagram of one method embodiment for creating an expense report according to the present invention.

FIG. 11 is a flow diagram of one method embodiment for creating an expense report according to the present invention. The method embodiment is shown generally with the reference 1110. At 1112, a travel distance is determined based on navigation data. The navigation data includes, but is not limited to, actual position data for the PDA, such as that which may be determined using GPS technology, and calculated route data. The travel distance is capable of being determined using one of the processes represented in FIGS. 8, 9 and 10. At 1114, the determined travel distance is associated with a PDA expense report entry. At 1136, the travel distance associated with a PDA expense report entry is transmitted to an electronic system external to the PDA. The external electronic system uses the transmitted travel distance associated with a PDA expense report entry to calculate a travel expense at 1138. For example, a factor such as $0.33 per mile is capable of being multiplied to the determined travel distance to calculate the travel expense. In one embodiment, the external electronic system has user interface(s) to change the distance-to-expense factor as desired. The external electronic system uses the calculated travel expense to create or generate an expense report at 1140. According to one embodiment, the actual position of the PDA is determined periodically, such as on the order of every second, for example. A running sum total of the distance traveled is recorded based on the periodically-determined position of the PDA.

Figure 12:
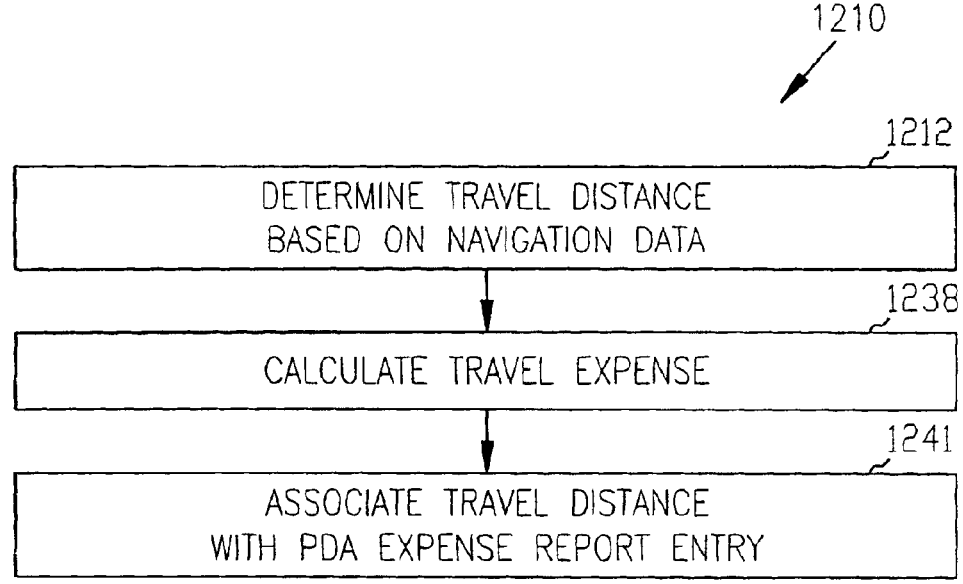
FIG. 12 is a flow diagram of one method embodiment for associating a travel expense with a PDA expense report entry according to the present invention.

FIG. 12 is a flow diagram of one method embodiment for associating a travel expense with a PDA expense report entry according to the present invention. The method embodiment is shown generally with the reference 1210. At 1212, a travel distance is determined based on navigation data. The navigation data includes, but is not limited to, actual position data for the PDA, such as that which may be determined using GPS technology, and calculated route data. The travel distance is capable of being determined using one of the processes represented in FIGS. 8, 9 and 10. The determined travel distance is used to calculate a travel expense at 1238. For example, a factor such as $0.33 per mile is capable of being multiplied to the determined travel distance to calculate the travel expense. In one embodiment, the PDA has user interface(s) to change the distance-to-expense factor as desired. The calculated travel expense is associated with a PDA expense report entry at 1241. One of ordinary skill in the art will understand that the PDA expense report entry is capable of being used to create a PDA expense report within the PDA, and is capable of being exported to an external electronic device which uses the PDA expense report entry to generate an expense report.

Figure 13:
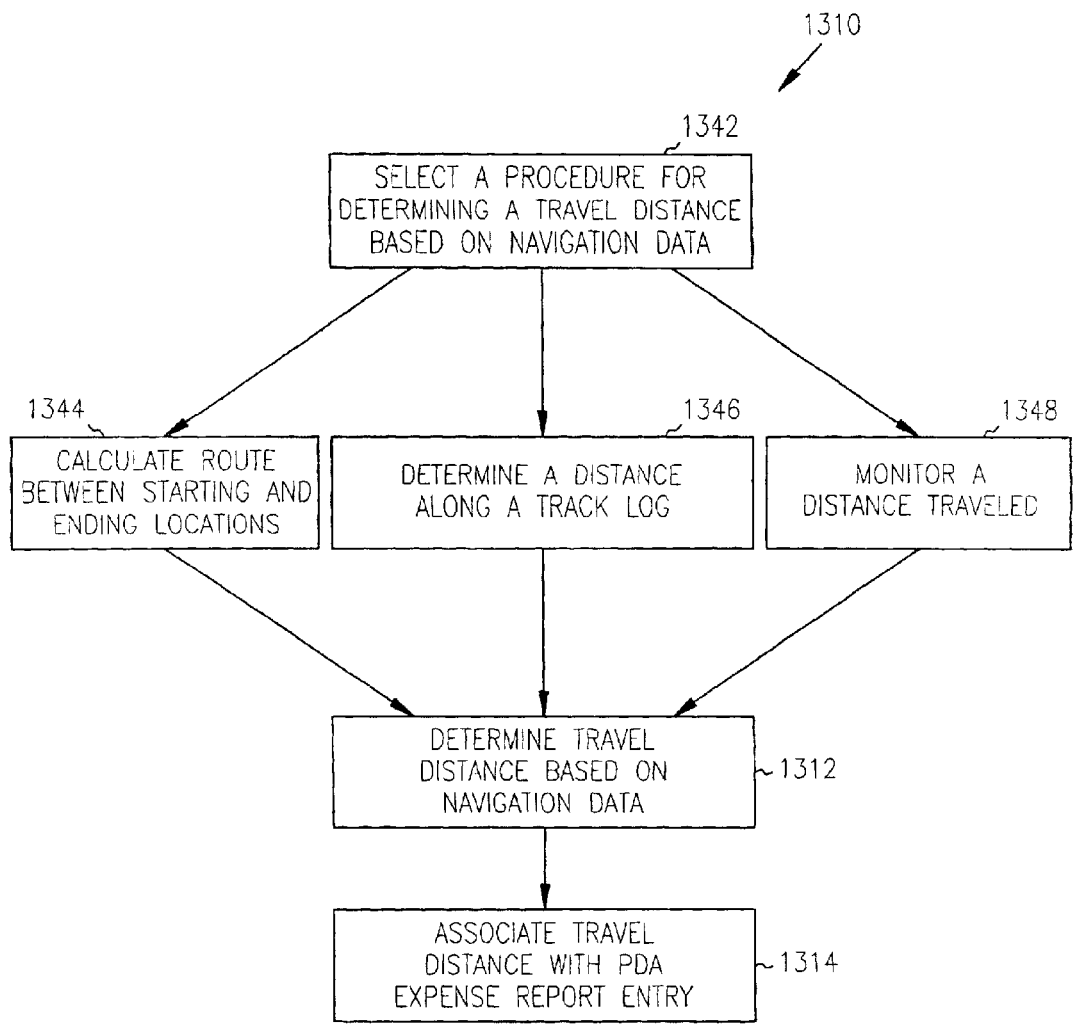
FIG. 13 is a flow diagram of one method embodiment for associating a travel expense with a PDA expense report entry according to the present invention.

FIG. 13 is a flow diagram of one method embodiment for associating a travel expense with a PDA expense report entry according to the present invention. The method embodiment is shown generally with the reference 1310. At 1342, a procedure is selected for determining a travel distance based on navigation data. In one embodiment, these procedures include a Route Calculating mode of operation as represented at 1344 and generally described with respect to FIG. 8, a Tracking mode of operation as represented at 1346 and generally described with respect to FIG. 9, and a Taxi Meter mode of operation as represented at 1348 and generally described with respect to FIG. 10. At 1312, the travel distance is determined based on navigation data using the selected procedure. The determined travel distance is associated with a PDA expense report entry at 1314.

FIG. 14 illustrates a known interface representing an Expense Receipt Details Page for a "Mileage" expense type, such as that used in a Palm PDA. The illustrated page 1410 includes pop-up or pull-down menus for selecting an expense category 1412 and an expense type 1414 for an expense entry. In the illustrated page, the selected expense category 1412 is "Business" and the selected expense type 1414 is "Mileage." The illustrated page 1410 further includes data entry fields in which to enter the vendor 1416, the vendor's city 1418, and the attendee(s) 1420 associated with the expense entry. Additionally, the known Expense Receipt Details Page includes data entry fields in which to enter a payment 1422 and a currency 1424, and further includes an OK control button 1426 for accepting and exiting the expense entry, a cancel control button 1428 for exiting the expense entry without accepting the entry, a delete control button 1430 for deleting the expense entry, and a note button 1432 for providing a note screen from which notes can be added, edited and read for the expense entry.

FIG. 15 illustrates one example of an interface representing an Expense Receipt Details Page for a "Mileage" expense type according to the present invention. The illustrated page 1510 includes pop-up or pull-down menus for selecting an expense category 1512 and an expense type 1514 for an expense entry. In the illustrated page, the selected expense category 1512 is "Business" and the selected expense type 1514 is "Mileage." The illustrated page 1510 further includes data entry fields in which to enter the vendor 1516, the vendor's city 1518, and the attendee(s) 1520 associated with the expense entry. Additionally, the Expense Receipt Details Page includes an OK control button 1526 for accepting and exiting the expense entry, a cancel control button 1528 for exiting the expense entry without accepting the entry, a delete control button 1530 for deleting the expense entry, and a note button 1532 for providing a note screen from which notes can be added, edited and read for the expense entry. Furthermore, according to the present invention, the Expense Receipt Details Page includes an Odometer control button 1534 used for the Odometer or Taxi Meter mode of operation, a Track control button 1536 used for the Tracking mode of operation, and a Route control button 1538 used for the Route Calculation mode of operation.

FIG. 16 illustrates one example of an interface representing an Odometer Page in which the odometer has been reset. Tapping on the Odometer control button 1534 in the screen 1510 of FIG. 15 brings up the Odometer Page 1610. The illustrated interface shows that a mileage record 1640 has been selected for the expense report entry. The Odometer Page 1610 includes a field representing an odometer or a counter 1642. The illustrated counter shows a travel distance to a tenth of a mile. The invention is not so limited, however. The Odometer Page 1610 further includes labels to display the start date 1644 and the end date 1646. The end date label 1646 displays the current date when the meter is running. That is, in this embodiment, the end date label 1646 displays the current date when the counter is tracking the travel distance. Additionally, the Odometer Page 1610 includes a Reset control button 1648 for resetting the counter 1642 to a starting distance "zero"; a Start control button 1650 to begin monitoring travel and incrementing the counter 1642 accordingly; an OK control button 1652 for accepting the distance in the counter 1642 and exiting the screen 1610; and a Cancel control button 1654 for exiting the screen 1610 without accepting the distance in the counter 1642.

FIG. 17 illustrates one example of an interface representing an Odometer Page in which the odometer has monitored a travel distance. That is, the counter 1742 has been incremented as the PDA traveled from the starting location. The Start control button 1650 of FIG. 16 has been changed to a Stop control button 1751 for stopping the monitoring of travel and the incrementing of the counter 1742. The OK control button 1652 of FIG. 16 has been changed to an Add control button 1753 for accepting the distance in the counter 1742, associating the distance with the expense entry, and exiting the screen 1710.

According to one embodiment, the odometer or counter 1642 is animated to roll like an odometer in an automobile. According to one embodiment, the field or label representing a start date 1644 is automatically entered when the Start control button 1650 is selected, and the field or label representing an end date 1646 is automatically entered when the Stop control button 1751 is selected. In one embodiment, the travel of the PDA is monitored using GPS technology. In one embodiment, the PDA includes a GPS receiver that is capable of being used to determine the travel of the PDA. According to one embodiment, the travel of the PDA is monitored using data obtained from a vehicle's odometer. For example, in one embodiment, the vehicle's odometer and the PDA are adapted to communicate to each other using a wireless communication technology, such as Bluetooth technology.

FIG. 18 illustrates one example of an interface representing a Route Calculator Page for determining a travel distance. Tapping on the Route control button 1538 in the screen 1510 of FIG. 15 brings up the Route Page 1810. The Route Page 1810 includes fields representing a start point 1856 and an end point 1858. According to various embodiments, the start point 1856 and/or end point 1858 are capable of being found using waypoints, map features, addresses, manually-entered coordinates, and/or manually selected points on an electronic map. The points on the electronic map are capable of being selected by tapping on a touch-sensitive screen or using a cursor position, for example. The Route Page 1810 further includes a Calculate Route control button 1860, an Add control button 1862, a Cancel control button 1864, and a Show control button 1866. Tapping on the Calculate Route control button 1860 causes various algorithms to be performed on the navigation data to generate a route between the entered start point 1856 and end point 1858, calculates a distance associated with the route, and displays the route. Tapping on the Add control button 1862 adds the distance calculated to the record for the expense report entry. Tapping on the Cancel control button 1864 exits the Route Page 1810 without saving any changes. Tapping on the Show control button 1866 after a route has been calculated opens a new window to provide a visual representation of the route.

FIG. 19 illustrates one example of an interface representing a Track Log Page for determining a travel distance by selecting a range of the track log. According to one embodiment, a user is presented with a dialog box 1910 that has two pop-up or pull-down menus. One pop-up menu 1912 is for specifying the start or starting time for the track log range and the other pop-menu 1914 is for specifying the end or ending time for the track log range. Tapping on the OK button 1916 accepts the newly selected range and closes the window. In the illustrated example, the selected range for the desired track log extends between 12:37 PM on Dec. 4, 2001 and the end of the active track log. Tapping on the Cancel button 1918 closes the window without accepting the newly selected range.

FIG. 20 illustrates one example of a pop-up or pull-down menu for the start time selected within the interface of FIG. 19. Options contained within the popup menu 2020 include "Choose Exact Time", "Choose Location", "Beginning of Log", "End of Log", and a set of track log points extending between the "Beginning of Log" and "End of Log." In the illustrated embodiment, only the timestamp associated with the location is listed. According to one embodiment, the "Choose Exact Time" option leads to a dialog box in which the user can type in an exact date and time. If the "Choose Location" option is chosen the device provides a query or question window in which the user is asked how the location is to be specified. One embodiment of the present invention provides the capability of specifying location by finding a map feature, an address, and/or a user waypoint using a Find interface. One embodiment of the present invention provides the capability of specifying location by displaying a map dialog such that the location can be manually specified using the displayed map dialog.

FIG. 21 illustrates one example of an interface for choosing an exact time. Tapping on the "Choose Exact Time" line in FIG. 20 displays the Choose Exact Time interface 2122 illustrated in FIG. 21. According to one embodiment, one or both of the starting time and the ending time are adapted to receive a user-specified time and date. This user-specified time and date does not necessarily correspond directly to the time and date of an actual track log point, as illustrated in the list shown in FIG. 20. However, actual track log points are able to be identified as the actual starting and ending endpoints for the range of the track log based on the entered time and date.

Figure 22:
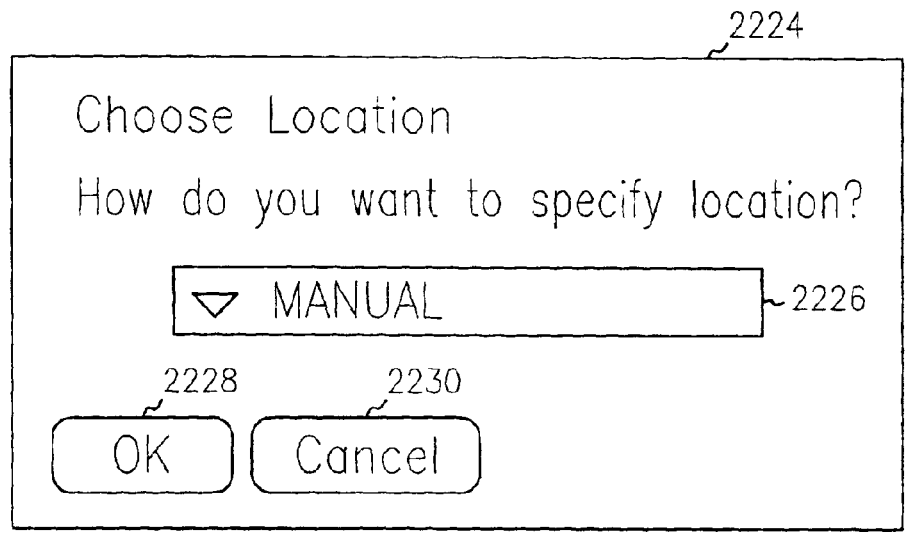
FIG. 22 illustrates one example of an interface for choosing a location.

FIG. 22 illustrates one example of an interface for choosing a location. According to one embodiment, a user is presented with a dialog box 2224 that has one pop-up or pull-down menu 2226 for specifying how the location is to be specified for either the starting or ending endpoint, as determined by whether a user navigated to the present interface 2224 through the starting or ending menu in FIG. 19. Tapping on the OK button 2228 accepts the method for specifying a location and closes the window. Tapping on the Cancel button 2230 closes the window without accepting the newly selected range.

Figure 23:
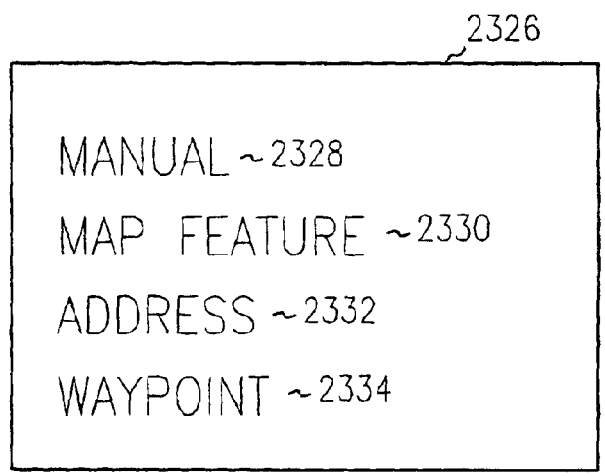
FIG. 23 illustrates one example of a pop-up or pull-down menu for interface shown in FIG. 22 for choosing a location.

FIG. 23 illustrates one example of a pop-up or pull-down menu for the interface shown in FIG. 22 for choosing a location. In this embodiment, the menu 2326 provides four ways to chose a location, including manually identifying or choosing a location 2328, using a map feature 2330, using an address 2332, and using a waypoint 2334. Upon tapping Map Feature, Address or Waypoint, a Find interface (not shown) is provided to allow a user to find the desired map feature, address or waypoint.

Figure 24:
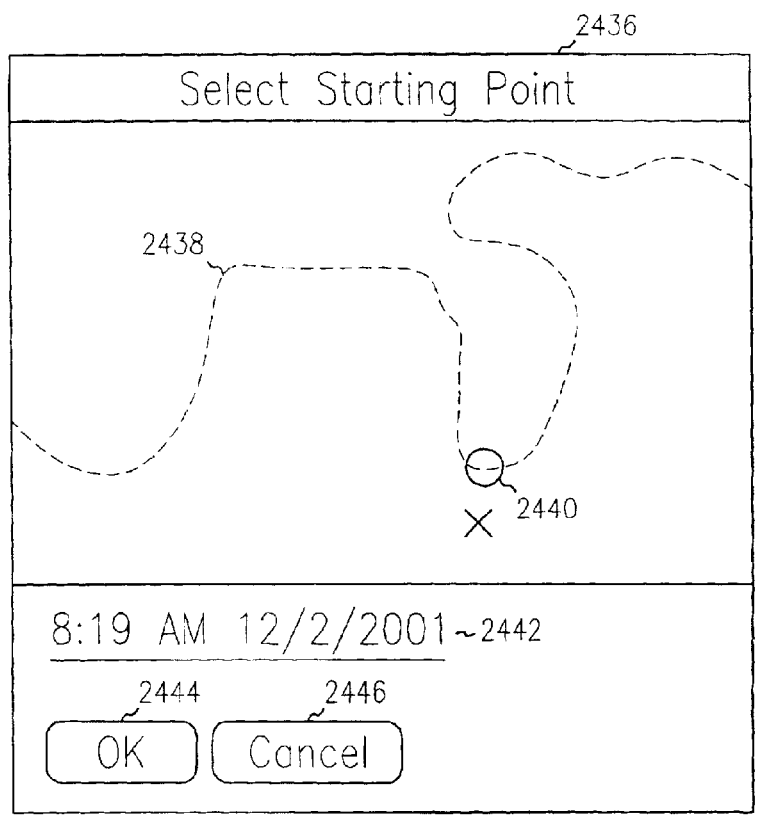
FIG. 24 illustrates one example of an interface for manually specifying endpoints for a set of track log points.

FIG. 24 illustrates one example of an interface for manually specifying endpoints for a set of track log points. The illustrated interface 2436 indicates that the interface is providing a means for selecting a starting endpoint because a user navigated to the present interface 2436 through the starting menu in FIG. 19. In one embodiment, this interface 2436 is displayed upon tapping Manual in the menu 2326 illustrated in FIG. 23. The interface 2436 of this embodiment includes an electronic map. According to this embodiment, the track log 2438 is displayed on the electronic map as a dotted line. The electronic map is capable of being panned or zoomed. Tapping a point on the map, as shown by the X, causes the nearest track point that fits some criteria to be highlighted, as shown by the small circle 2440. The time 2442 that the selected track point 2440 was recorded is also displayed. Tapping the OK button 2444 saves the selected start point and closes the interface 2436. Tapping Cancel closes the interface 2436 without saving the selected start point. One of ordinary skill in the art will understand, upon reading and comprehending this disclosure, that an ending endpoint is capable of being found using a similar process.

Figure 25:
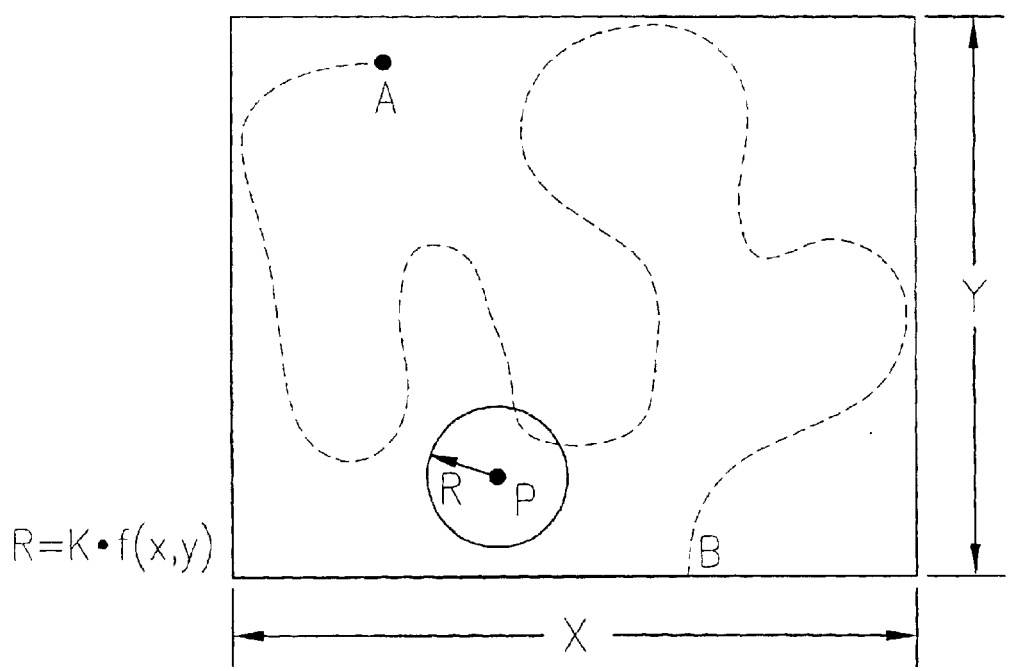
FIG. 25 illustrates one example of criteria used to search for the track point nearest to a specified point.

FIG. 25 illustrates one example of criteria used to search for the track point nearest to a specified point. Criteria is used in FIG. 24 to find the nearest track point 2440 based on a selected point (X) on the map. It is often appropriate to incorporate criteria in the search for the nearest track point because, for example, the concept of a nearest track point is not very useful for a point 500 miles away from a recorded track log which is only 10 miles long. As such, it is desirable to find the track log point that is nearest to a desired or selected point P and that is also within a certain radius R of point P. According to one embodiment, given a recorded track log which begins at point A and ends at point B and is bounded by a box that is X by Y units in dimension, the radius R is calculated as a function of X and Y.

$$R=f(X,Y)$$

For example, for an empirically determined constant k, a value for the radius R is capable of being determined by the following equation:

$$R=k \times (X+Y).$$

One of ordinary skill in the art will appreciate, upon reading and comprehending this disclosure, that there are other methods for identifying and evaluating criteria to ensure that the nearest point is meaningful for a selected point P.

One of ordinary skill in the art will understand, upon reading and comprehending this disclosure, that the PDA device of the present invention is capable of performing a number of integrated navigation data/expense report functions, and is further capable of performing a number of integrated GPS/expense report applications. For example, the PDA device of the present invention is capable of determining a travel distance based on navigation data, and associating the travel distance with a PDA expense report entry. In one embodiment, a procedure for determining a travel distance is selected. One procedure involves calculating a route between a starting location and an ending location. This procedure is capable of being performed without GPS technology. Another procedure involves determining a distance along a track log between the starting location and the ending location. In one embodiment, the track log data points that make up the track log are determined using GPS technology. Another procedure involves incrementing a counter to monitor a distance traveled from the starting location. According to various embodiments, the distance traveled is monitored using GPS technology and/or an odometer-like device in a vehicle. As such, the present invention provides a PDA user with the ability to flexibly, accurately and efficiently determine travel distances for expense reports.

As one of ordinary skill in the art will understand upon reading and comprehending this disclosure, any one or more of the above features can be combined into a particular embodiment of the invention. Likewise, in the invention any one or a combination of the above functions can be optionally de-activated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal that represents a sequence of instructions which, when executed by a processor, such as processor 236 in FIG. 2, cause the processor to perform the respective method. In other embodiments, methods provided above are implemented as a set of instructions contained on a computer-accessible medium, such as memory 242 in FIG. 2, capable of directing a processor, such as processor 236 in FIG. 2, to perform the respective method. In varying embodiments, the medium includes a magnetic medium, an electronic medium, or an optical medium.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to systems, devices and methods for integrating GPS receiver technology into a PDA such that PDA functions are integrated with GPS capabilities. The present invention integrates navigation data, such as GPS navigation data, with Personal Digital Assistant (PDA) expense reporting functions to flexibly, accurately and efficiently determine travel distances for expense reports.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A method of using a Personal Digital Assistant (PDA) to provide travel expenses for an expense report, comprising:
   monitoring travel be the PDA and recording track log data points in the PDA that represent the PDA travel; and
   associating a travel distance from the recorded track log with a PDA expense report entry.

2. The method of claim 1, wherein monitoring travel by the PDA includes:
   identifying a starting location;
   identifying an ending location; and
   wherein associating the travel distance includes determining the travel distance based on the starting location, the ending location, and the recorded track log.

3. The method of claim 2, further comprising:
   wirelessly transmitting the starting location and the ending location from the PDA to an external device such that the external device is capable of calculating the route and determining the travel distance based on the starting location, the ending location, and the recorded track log; and
   wirelessly transmitting the travel distance from the external device to the PDA.

4. The method of claim 2, wherein at least one of the identifying a starting location and identifying and ending location includes using a waypoint to identify the location.

5. The method of claim 2, wherein at least one of identifying a starting location and identifying an ending location includes using an address to identify the location.

6. The method of claim 2, wherein at least one of identifying a starting location and identifying an ending location includes using a map feature to identify a location.

7. The method of claim 2, wherein at least one of the identifying a starting location and identifying an ending location includes manually entering coordinates.

8. The method of claim 2, wherein at least one of the identifying a starting location and identifying an ending location includes manually selecting a location on an electronic map.

9. The method of claim 1, wherein associating a travel distance includes:
identifying a first endpoint on a newly recorded track log;
identifying a second endpoint on the newly recorded track; and
determining the travel distance along the newly recorded track log between the first endpoint and the second endpoint.

10. The method of claim 9, further comprising forming the newly recorded track log in the PDA by monitoring PDA travel.

11. The method of claim 10, wherein forming the newly recorded travel log in the PDA by monitoring PDA travel includes:
identifying PDA positions using global positioning system (GPS) technology in the PDA over a period of time; and
recording a set of track log points in the PDA for the newly recorded track log by using at least some of the identified PDA positions.

12. The method of claim 10, further comprising storing the newly recorded track log in a memory located in the PDA.

13. The method of claim 10, further comprising storing the newly recorded track log in memory of an electronic device that is external to the PDA.

14. The method of claim 13, further comprising wirelessly transmitting the first endpoint, the second endpoint, and the newly recorded track log to the electronic device such that the external device is capable of determining the travel distance along the newly recorded track log between the first endpoint and the second endpoint.

15. A method of using a Personal Digital Assistant (PDA) to provide travel expenses for an expense report, comprising:
identifying a starting location of the PDA;
monitoring travel by the PDA from the starting location;
recording a number of track log data points in the PDA that represent actual positions of the PDA from the monitored travel by the PDA; and
associating a travel distance with a PDA expense report entry, the travel distance taken from the number of track log data points in the PDA that represent actual positions of the PDA from the monitored travel by the PDA.

16. The method of claim 15, wherein:
identifying a starting location includes resetting a counter; and
monitoring travel from the starting location includes incrementing the counter.

17. The method of claim 15, wherein monitoring travel from the starting location includes monitoring a position by the PDA using global positioning system (GPS) technology.

18. The method of claim 15, wherein monitoring travel from the starting location includes receiving a signal from a vehicle odometer that indicates the distance traveled.

19. The method of claim 15, further comprising:
transmitting the travel distance associated with the PDA expense report entry to an electronic system external to the PDA;
calculating a travel expense based on the travel distance transmitted to the electronic system; and
creating an expense report that includes the travel expense.

20. The method of claim 15, further comprising calculating a travel expense based on the travel distance, wherein associating the travel distance with a PDA expense report entry includes associating the travel expense with the PDA expense report entry for use in creating the expense report.

21. A method of using a Personal Digital Assistant (PDA) to provide travel expenses for an expense report, comprising:
selecting a procedure in the PDA for determining a travel distance based on navigation data, wherein the procedures for determining a travel distance include:
calculating a route between a starting location and an ending location with the PDA;
determining a distance with the PDA along a track log between the starting location and the ending location; and
incrementing a counter in the PDA to monitor a distance travelled from the starting location;
determining the travel distance with the PDA based on navigation data using the selected procedure; and
associating the travel distance with a PDA expense report entry.

22. The method of claim 21, wherein calculating a route between a starting location and an ending location includes:
wireless transmitting the starting location and the ending location from the PDA to an external electronic device such that the external device is capable of calculating the route and determining the distance; and
wirelessly transmitting the distance from the external device to the PDA.

23. The method of claim 21, wherein determining a distance along a track log between the starting location and the ending location further comprises forming the track log by monitoring PDA travel.

24. The method of claim 23, wherein forming the travel log by monitoring PDA travel includes:
identifying PDA positions using global positioning system (GPS) technology in the PDA over a period of time; and
forming a set of track log points for the track log by using a least some of the identified PDA positions.

25. The method of claim 21, wherein determining a distance along a track log between the starting location and the ending location further comprises storing the track log in a memory located in the PDA.

26. The method of claim 21, wherein determining a distance along a track log between the starting location and the ending location further comprises storing the track log in an electronic device memory that is external to the PDA.

27. The method of claim 26, wherein determining a distance along a track log between the starting location and the ending location further comprises wirelessly transmitting the first endpoint, the second endpoint, and the track log to the electronic device such that the external device is capable of determining the distance along the track log between the first endpoint and the second endpoint.

28. The method of claim 21, further comprising resetting the counter to zero at the starting location.

29. The method of claim 21, further comprising monitoring a position of the PDA using global positioning system (GPS) technology in the PDA to monitor the distance traveled from the starting location.

30. The method of claim 21, further comprising receiving a signal from a vehicle odometer that indicates the distance traveled to monitor the distance traveled from the starting location.

31. A Personal Digital Assistant (PDA) device with an integrated electronic map and expense report, comprising:
   a processor; and
   a memory adapted to communicate to the processor, the memory including navigation data, expense report data, and computer-executable instructions, wherein the computer-executable instructions are operable to;
      monitor travel of the PDA;
      record track log data points that represent actual positions of the PDA from the monitored travel of the PDA;
      identify a travel distance from the recorded track log data points; and
      associate that travel distance with the expense report data.

32. The PDA device of claim 31, wherein the memory includes a removable map data cartridge on which electronic map data is stored.

33. The PDA device of claim 31, wherein the device includes a transceiver adapted for the transmitting and receiving wireless signals.

34. The PDA device of claim 31, further comprising a Global Positioning System (GPS) receiver adapted to receive GPS signals, wherein the GPS receiver is adapted to communicate with the processor.

35. The PDA device of claim 31, wherein the computer-executable instructions operable to identify a travel distance includes computer-executable instructions operable to:
   identify a starting location;
   identify an ending location;
   calculate a route between the starting location and the ending location; and
   determine a distance along the route between the starting location and the ending location.

36. The PDA device of claim 31, wherein the computer-executable instructions operable to identify a travel distance includes computer-executable instructions adapted to:
   identifying a first endpoint on a track log segment;
   identifying a second endpoint on the track log segment; and
   determine a distance along the track log segment between the first endpoint and second endpoint.

37. A method of using a Personal Digital Assistant (PDA) to provide travel expenses for an expense report, comprising:
   determining a travel distance with the PDA having business and non-business segments based on navigation data; and
   associating the travel distance of the business segments with a PDA expense report entry.

38. The method of claim 37, wherein determining a travel distance based on navigation data includes determining a travel distance associated with a completed trip.

39. The method of claim 38, wherein determining a travel distance associated with a completed trip includes identifying a first and a second endpoint from within a track log of data points of the completed trip in order to associate a particular defined segment with a PDA expense report entry.

40. The method of claim 37, wherein determining a travel distance includes identifying a starting location for a PDA from which a travel of the PDA is monitored in taxi meter mode in order to associate only particular routes of travel with a PDA expense report entry.

41. The method of claim 37, wherein the method further includes;
   transmitting the PDA expense report entry to an electronic system external to the PDA;
   using the transmitted PDA expense report entry to calculate a travel expense; and
   using the calculated travel expense to generate an expense report.

42. A method of using a Personal Digital Assistant (PDA) to provide travel expenses for an expense report, comprising;
   monitoring a travel distance with the PDA;
   associating the travel distance with an expense report entry on the PDA; and
   entering a vendor to which the travel distance will be expensed, a travel end location, and one or more attendees travelling to the end location in association with the expense report entry.

43. A Person Digital Assistant (PDA), comprising:
   a routing capability;
   a position monitoring capability associated with the routing capability; and
   wherein the PDA includes an odometer interface page available on a display and which is operable for recording an expense report entry.

44. The PDA of claims 43, wherein the PDA includes one or more interface pages, available on the display, which are actionable using a stylus to create the expense report entry.

45. The PDA of claim 44, wherein at least one interface page is actionable to define the expense report entry in reference to recorded track log data and a first and a second specified time of day.

* * * * *